(12) United States Patent
Shekhar et al.

(10) Patent No.: US 12,474,759 B2
(45) Date of Patent: Nov. 18, 2025

(54) PLATFORM VOLTAGE REGULATOR CIRCUITRY CONFIGURATIONS

(71) Applicant: Intel Corporation, Santa Clara, CA (US)

(72) Inventors: Sameer Shekhar, Portland, OR (US); Amit K. Jain, Portland, OR (US); Chin Lee Kuan, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 750 days.

(21) Appl. No.: 17/683,435

(22) Filed: Mar. 1, 2022

(65) Prior Publication Data
US 2023/0280814 A1 Sep. 7, 2023

(51) Int. Cl.
*G06F 1/3234* (2019.01)
*G05F 1/575* (2006.01)
*H02M 3/07* (2006.01)

(52) U.S. Cl.
CPC ............ *G06F 1/3234* (2013.01); *G05F 1/575* (2013.01); *H02M 3/07* (2013.01)

(58) Field of Classification Search
CPC ........ G06F 1/3234; G06F 1/575; H02M 3/07; H02M 1/0006
See application file for complete search history.

(56) References Cited

U.S. PATENT DOCUMENTS

| | | | | |
|---|---|---|---|---|
| 5,774,813 A | * | 6/1998 | Jokinen | G05F 1/577 455/574 |
| 8,018,208 B1 | * | 9/2011 | Kahn | H02M 3/156 323/224 |
| 2016/0116927 A1 | * | 4/2016 | Chen | G05F 1/575 323/280 |
| 2017/0163155 A1 | * | 6/2017 | Chieng | H02M 3/1588 |
| 2018/0375438 A1 | * | 12/2018 | Shekhar | G05F 1/46 |
| 2019/0214905 A1 | * | 7/2019 | Puggelli | H02M 3/158 |
| 2020/0052583 A1 | * | 2/2020 | Shekhar | H02M 3/158 |
| 2023/0393639 A1 | * | 12/2023 | Gunther | G06F 1/3212 |

* cited by examiner

*Primary Examiner* — Hyun Soo Kim
(74) *Attorney, Agent, or Firm* — NICHOLSON DE VOS WEBSTER & ELLIOTT LLP

(57) ABSTRACT

An apparatus, system, and method for improved thermal design power (TDP) range are provided. A device includes a first voltage regulator configured to provide first voltage of a first voltage value, a second voltage regulator configured to provide a second voltage of a second, different voltage value, a first capacitor electrically coupled between a first output of the first voltage regulator and a ground, a second capacitor electrically coupled between a second output of the second voltage regulator and the ground, a first switch electrically coupled between the first output and the second output, a second switch situated in parallel with the first switch, the second switch electrically coupled between the first output and the second output, and a controller configured to provide control signals that control the first voltage regulator, the second voltage regulator, the first switch, and the second switch.

15 Claims, 4 Drawing Sheets

__(12,474,759 B2)__

PLATFORM VOLTAGE REGULATOR CIRCUITRY CONFIGURATIONS

TECHNICAL FIELD

Embodiments pertain to central processing unit (CPU) performance and battery run times. Embodiments improve performance by optimizing available physical routing resources, decoupling resources, modifying voltage regulator (VR) control, or a combination thereof, among others.

BACKGROUND

Performance and battery run times of electrical or electronic components are challenged at lower voltage ranges. A thermal design power (TDP), sometimes called a thermal design point, is a maximum amount of heat generated by an electrical or electronic component that a cooling system in a computer is designed to dissipate under any workload. Performance and battery run time for a lower TDP, such as 7-15 Watts or a lesser wattage, are especially challenged.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments use one or more electrically controllable switch components situated to improve performance/Watt of a platform coupled to multiple voltage regulators. Embodiments can pool platform routing resources and/or decoupling capacitance of physically adjacent voltage domains (voltage regulators (VRs) operating at different voltages) via interconnection switches to obtain lower load line and conductive path losses, sometimes called $I^2R$ losses. Embodiments can modify a VR controller to enable selective turn-off of power switches in parallel domains based on control commands over a communication interface (e.g., serial voltage identification (SVID), inter-integrated circuit ($I^2C$) communication, etc.) from CPU. Embodiments include switches and corresponding interconnections that allow VRs to utilize decoupling capacitors, routing resources, or a combination thereof.

The switches can include a first switch and a second switch connected between power planes of adjacent (e.g., physically, or directly adjacent power planes) VRs. The first switch can be electrically connected between the power planes closer to the VRs. The second switch can be electrically connected between the power planes closer to a die powered by the VRs. The first switch can be connected as close as practical, given design constraints, to a VR output. Design constraints can include components, board size, board layout, signal breakout or the like. The second switch can be connected as close as practical, given design constraints, to a die input.

Embodiments provide longer battery run times due to reduced power consumption under low load conditions via (1) reduced voltage penalty of load lines and $I^2R$ losses; (2) reduced power losses in the VR and associated inductor. For low power conditions, embodiments provide a power reduction for sustained workloads. Alternately, for the same power, higher performance can be achieved via higher base frequencies.

Figure 1:
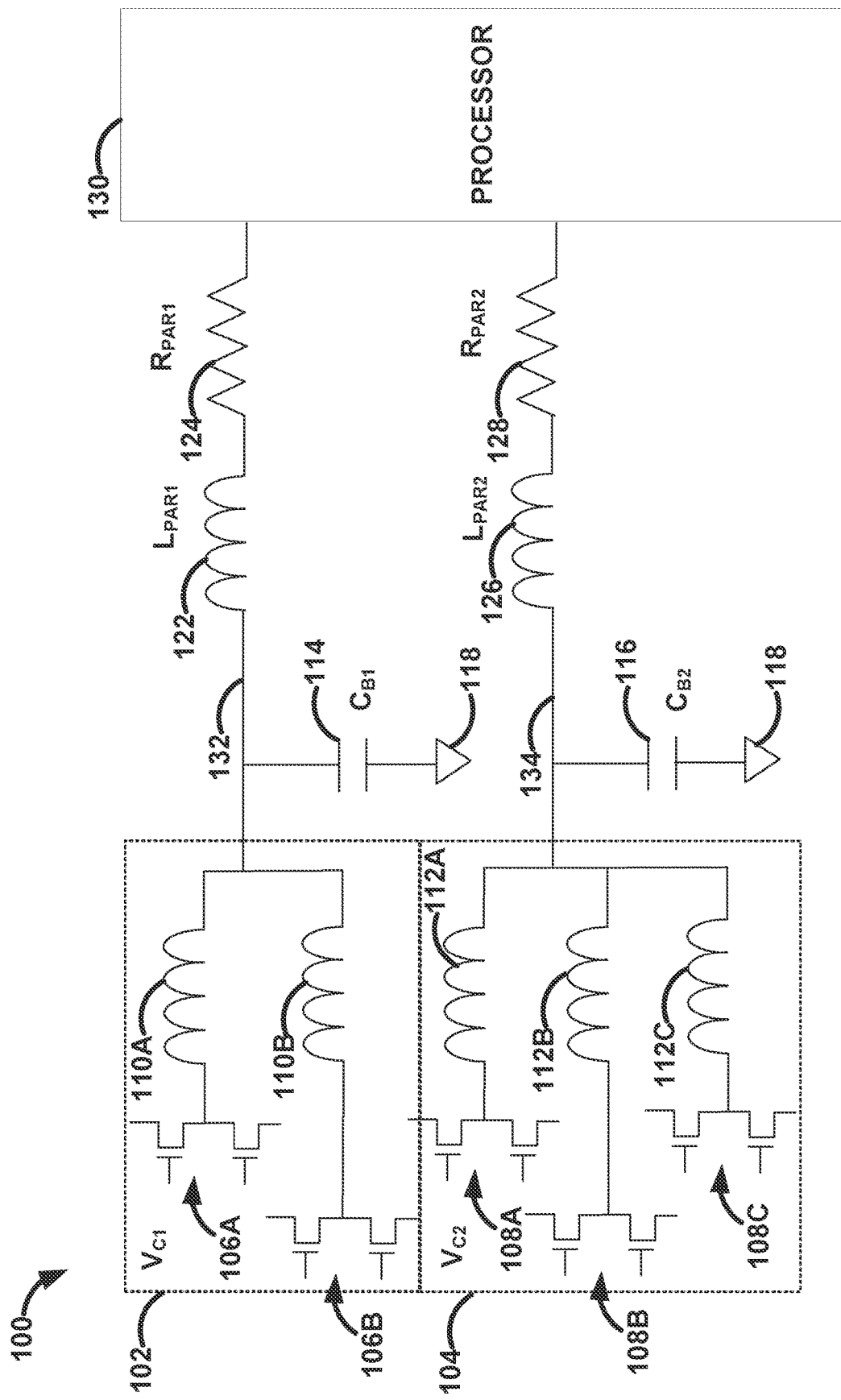
FIG. 1 illustrates, by way of example, a circuit diagram of an embodiment of a circuit that includes multiple VRs.

FIG. 1 illustrates, by way of example, a circuit diagram of an embodiment of a circuit 100 that includes multiple VRs 102, 104. The circuit 100 as illustrated includes VRs 102, 104 independently coupled to a die 130. The VRs 102, 104 are not electrically connected to each other. An inductor 122 and resistor 124 represent a respective parasitic inductance and resistance of the path to die for VR 102. An inductor 126 and resistor 128 represent a respective parasitic inductance and resistance of the VR 104. A bulk capacitor 114 acts as a filter charging and discharging to help output of the VR 102 refrain from changing too far from desired value. A bulk capacitor 116 also acts as a filter charging and discharging to help output of the VR 104 refrain from changing too far from the desired value.

Many computer systems include platform buck VRs 102, 104 placed in close proximity to the processor 130, such as on a motherboard. FIG. 1 shows a very common scenario of adjacent placement of two VRs with voltages $V_{C1}$, $V_{C2}$ with 2 and 3 phases (each inductor 110A and 110B; 112A, 112B, and 112C of a VR 102, 104 realize these phases), respectively.

The VR 102 comprises power switches 106A, 106B electrically coupled to respective inductors 110A, 110B. The power switches 106A, 106B are electrically upstream from the inductors 110A, 110B of the VR 102. That is, the inductors 110A, 110B receive electrical power through the switches 106A, 106B, respectively. The inductors 110A, 110B are electrically coupled in parallel to each other. A controller (shown elsewhere) can control electrical power to one or more of the inductors 110A, 110B by controlling a voltage provided to the switches 106A, 106B.

The VR 104 comprises power switches 108A, 108B, 108C electrically coupled to respective inductors 112A, 112B, 112C. The power switches 108A, 108B, 108C are electrically upstream from the inductors 112A, 112B, 112C of the VR 104. The inductors 112A, 112B, 112C receive electrical power through the switches 108A, 108B, 108C respectively. The inductors 112A, 112B, 112C are electrically coupled in parallel to each other. A controller (shown elsewhere) can control electrical power to one or more of the inductors 112A, 112B, 112C by controlling a voltage provided to the switches 108A, 108B, 108C.

A capacitor 114, sometimes called a bulk capacitor is connected electrically with the processor 130. As previously discussed, the bulk capacitor 114 charges and discharges to help output the VR 102 refrain from changing too far from the desired value. The capacitor 114 is electrically situated between output 132 of the VR 102 and a reference voltage 118 (e.g., ground, or other voltage).

A capacitor 116, sometimes called a bulk capacitor is connected electrically with the processor 130. As previously discussed, the bulk capacitor 116 charges and discharges to help output the VR 104 refrain from refrain from changing too far from the desired value. The capacitor 116 is electrically situated between output 134 of the VR 104 and the reference voltage 118. (e.g., ground, or other voltage).

An inductor 122 represents a parasitic inductance of the path for the VR 102. A resistor 124 represents a parasitic resistance of the path for the VR 102. Similarly, an inductor 126 represents a parasitic inductance of the VR 104 and a resistor 128 represents a parasitic resistance of the VR 104.

When operating in a low power mode, the controller causes the VR 102 to provide power through only one of the inductors 110A, 110B. Similarly, when operating in a low power mode, the controller causes the VR 104 to provide power through only one of the inductors 112A, 112B, 112C. Having only a single inductor of the VR 102 and a single inductor of the VR 104 operating is electrically inefficient. This is because there are two sets of electrical losses, one set of electrical losses from operation of the VR 102 and another set of electrical losses from operation of the VR 104. The electrical losses include load line losses from the output 132, 134 travelling to the processor 130. The electrical losses include losses due to the parasitic inductor 122, 126 and parasitic resistor 124, 128.

For each VR, it is beneficial to provide higher bulk capacitance and lower parasitic inductance and lower parasitic resistance. These are constrained due to available routing resources, acceptable platform cost and other constraints. The VRs 102, 104 are sized to support maximum current but operate in a lower power and current state for most of the time with only one VR 102 inductor 110A, 110B and only one VR 104 inductor 112A, 112B, 112C powered on. This means underutilization during low power operation of bulk capacitance, routing resources and fixed VR losses (switching and control).

Figure 2:
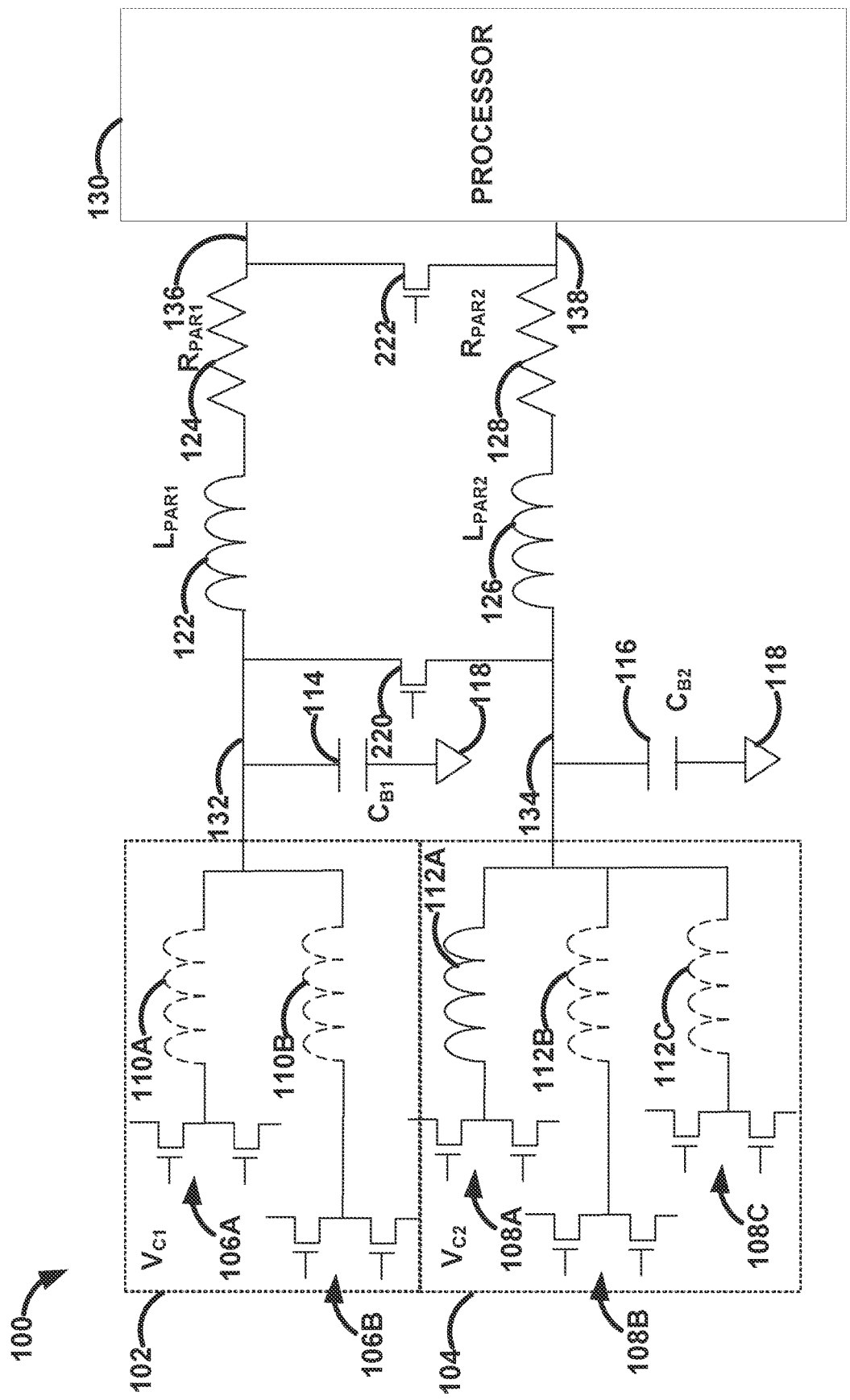
FIG. 2 illustrates, by way of example, a circuit diagram of an embodiment of a system that includes improved electrical losses.

FIG. 2 illustrates, by way of example, a circuit diagram of an embodiment of a system 200 that includes improved electrical losses. Inductors 110A, 110B, 112B, 112C are illustrated in dashed lines indicating that they are not active. The system 200 as illustrated includes the components coupled as described with regard to FIG. 1 and also includes two switches 220, 222 electrically coupled between outputs 132, 134 of the VRs 102, 104. The switches 220, 222 can be on either side of a board (top or bottom) that contains the VRs 102, 104. A gate of each of the switches 220, 222 is coupled to the controller (shown elsewhere). The controller controls the gate to either (i) short the outputs 132, 134, such as when the VRs 102, 104 are in low power mode or (ii) electrically isolate the outputs 132, 134, such as when the VRs 102, 104 are not in low power mode. In low power mode, the controller can short the outputs 132, 134 by providing command to the switches 220, 222. The switches 220, 222 can be turned on together or individually.

This shorting of the outputs 132, 134 and 136 to 138 is beneficial for a variety of reasons. First, the shorting allows a single inductor 110A, 110B, 112A, 112B, 112C to provide the necessary power to the processor. While only a single inductor is activated only one VR 102, 104 is experiencing electrical losses. Second, the shorting of the outputs 132, 134 increases the net capacitance because the bulk capacitors 114, 116 are electrically in parallel when the outputs 132, 134 are shorted. Third, the shorting of the outputs 132 to 134 and 136 to 138 decreases net parasitic inductance and resistance because the inductors 122 and 126 and the resistors 124 and 128 are electrically in parallel when the outputs 132 and 134 and 136 and 138 are shorted.

The switches 220, 222 can include a transistor or other switch component (or components) that is sized to handle the desired electrical power. The switch 220 can be situated physically closer to the output terminal of the VR 102, 104 than the switch 222. The switch 222 can be situated physically closer to the processor 130 than the switch 220. The switch 220 can be situated as close as practical considering design constraints, size constraints, board space, or the like. The closer the switch 220 is to 114 and 116, the better the improvement in pooling the bulk capacitance. The closer the switch 222 is to the die 130, the better the improvement in reducing the parasitic inductance and parasitic resistance characteristics of the VRs 102, 104 in low power operation.

In low power operation, the inductor 110A, 110B, 112A, 112B, 112C that is powered on by the controller can be chosen to reduce overall path impedance. The inductor 110A, 110B, 112A, 112B, 112C with the shortest path to the processor 130 has the best operating characteristics in terms of electrical efficiency because it has lowest path impedance. Some embodiments can a priori select the inductor with the shortest path to the processor 130 to operate the processor 130 in low power mode.

In sum, when one of the switches 220, 222 is activated the bulk capacitances of the capacitors 114, 116 is pooled. Both switches 220, 222 being on uses the routing resources allocated to each VR 102, 104 to lower loadline and resistance path losses, allows the controller to turn off one VR 102, 104 completely, such as to help reduce power losses, and allows for choice of a VR inductor 110A, 110B, 112A, 112B, 112C that remains on in low power mode to reduce (e.g., minimize) loadline and resistance path losses based on board layout.

Embodiments can provide low power mode power savings. This means a battery run time improvement. The saved power can also be used to increase processor 130 processor frequency while performing the same work.

Figure 3:
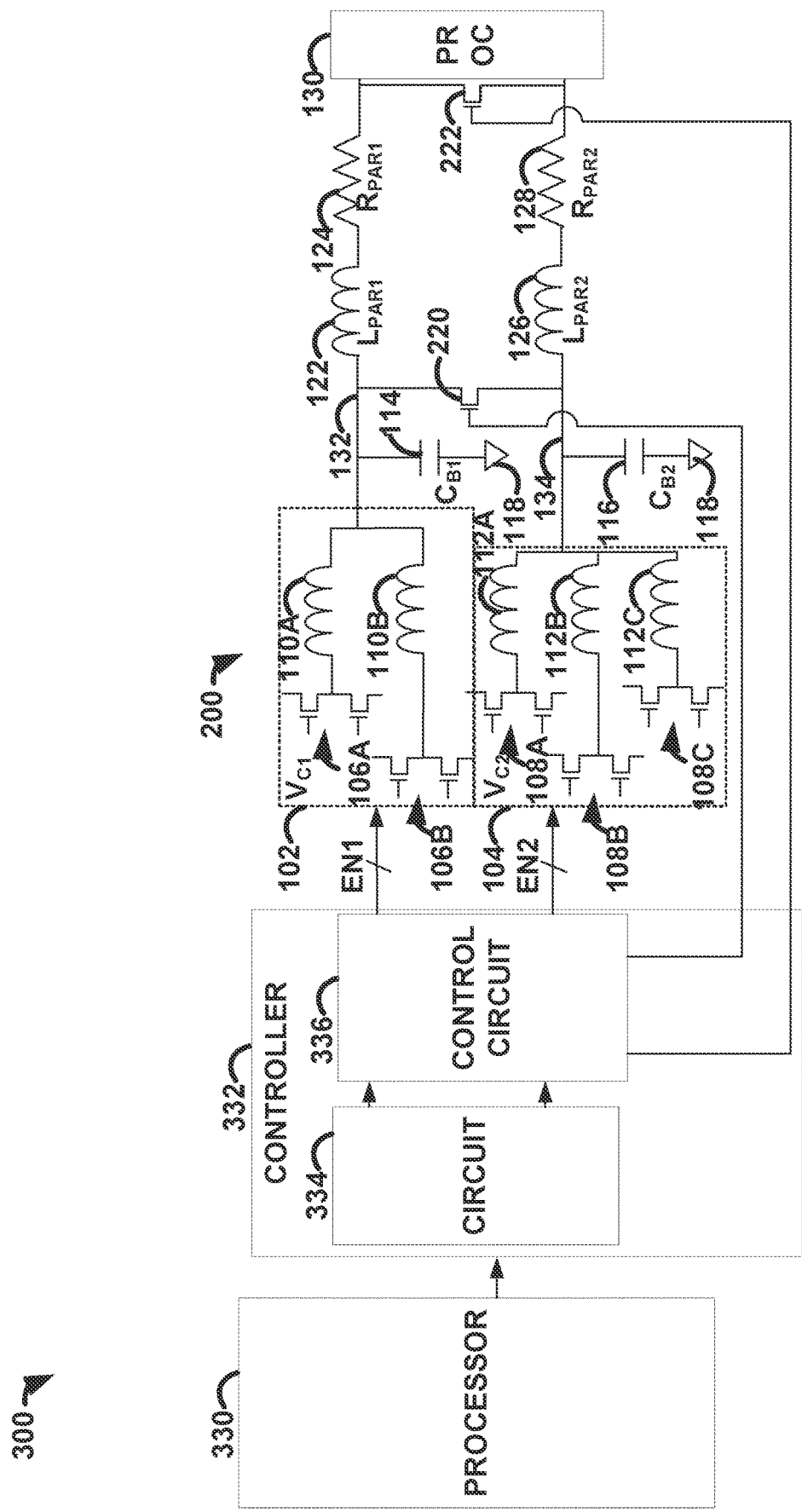
FIG. 3 illustrates, by way of example, a circuit diagram of an embodiment of a system with improved electrical efficiency.

FIG. 3 illustrates, by way of example, a circuit diagram of an embodiment of a system 300 with improved electrical efficiency. The system 300 as illustrated includes the system 200 electrically coupled to a controller 332. The controller 332 is electrically coupled to a processor 330 that provides control signals to the controller 332. The control signals from the processor 330 to the controller 332 indicate a power mode (e.g., low power mode or non-low power mode, among others), power level (e.g., including maximum current, voltage, or the like). The circuit 334, which can include digital to analog converters (DACs), such as digital DACs, in the VR controller 332 decodes these control signals to reference voltages ($V_{REF1}$, $V_{REF2}$) and inductor enable signals ($EN_1$, $EN_2$) based on maximum current for each voltage domain ($V_{C1}$, $V_{C2}$). The reference voltages $V_{REF1}$, $V_{REF2}$ are provided to the VRs 102, 104, respectively. The enable signals $EN_1$, $EN_2$ are provided to the switches 106A, 106B, 108A, 108B, 108C and control which of the inductors 110A, 110B, 112A, 112B, 112C are active at a given time. The enable signals $EN_1$, $EN_2$ provide the controller 332 the ability to select which of the inductors 110A, 110B, 112A, 112B, 112C provides power in the low power mode.

The controller 332 further controls whether the switches 220, 222 are active. When the processor 330 requests substantially the same voltage for $V_{C1}$ and $V_{C2}$ a control circuit 336 enables switches 220, 222 to short their power planes together both near the die 130 end and the VR output 132, 134, such as to pool bulk capacitance resources of the two VR 102, 104 domains into a single domain. When $V_{C1}$ and $V_{C2}$ are substantially the same (e.g., within about 5% of each other or a specified amount of voltage such as 100 milli-Volts) the processor 330 transmits the combined current of the two domains together. Typically, this is less than the sum of the individual maximum current values. Overall, the total voltage penalty is reduced due to reduction in both loadline due to switches 220, 222 and lower requested current. The loadine of the combined domains can be programmed as the advanced voltage positioning DC loadline in the VR controller 332 and also communicated to the processor 330, (e.g., via basic input/output system (BIOS) mailbox). If the maximum current can fit within the capability of a single inductor 110A, 110B, 112A, 112B, 112C then the control circuit 336 turns off all but one of the inductors 110A, 110B, 112A, 112B, 112C to reduce power loss.

While the FIGS. illustrate two VRs 102, 104, embodiments are applicable to systems, devices, or methods with more than two power stages. While the FIGS. illustrate VRs 102, 104 with two power stages and three power stages, any number of power stages greater than one can be used in a VR.

One or more of the components illustrated in the FIGS. can be implemented using hardware, software, firmware, or a combination thereof. For example, the processor 330, the controller 332, the die 130, or a component thereof can be implemented using hardware, software, firmware, or a combination thereof. Hardware in this context includes electric or electronic components configured to implement the functionality of the component. Electric or electronic components can include transistors, resistors, capacitors, inductors, diodes, switches, multiplexers, amplifiers, power supplies, memory devices, logic gates (e.g., AND, OR, XOR, negate, or the like), processing devices (e.g., a central processing unit (CPU), application specific integrated circuit (ASIC), field programmable gate array (FPGA), graphics processing unit (GPU), or the like), analog to digital converter (ADC), digital to analog converter (DAC), radio (e.g., receiver, transmitter, or transceiver), a combination thereof, or the like.

Figure 4:
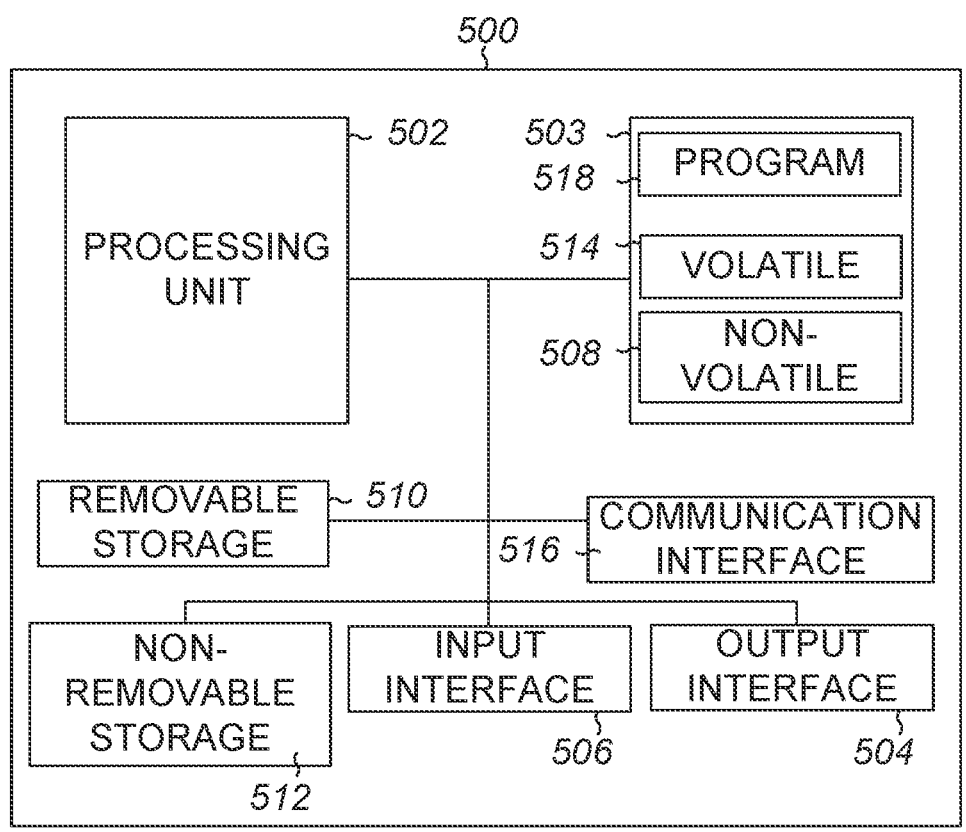
FIG. 4 illustrates, by way of example, a block diagram of an embodiment of a machine (e.g., a computer system) in which the improved VR system of FIG. 2 or 3, or another device discussed herein can be used.

FIG. 4 illustrates, by way of example, a block diagram of an embodiment of a machine 500 (e.g., a computer system) in which the improved VR system of FIG. 2 or 3, or another device discussed herein can be used. One example machine 500 (in the form of a computer), may include a processing unit 502, memory 503, removable storage 510, and non-removable storage 512. Although the example computing device is illustrated and described as machine 500, the computing device may be in different forms in different embodiments. Further, although the various data storage elements are illustrated as part of the machine 500, the storage may also or alternatively include cloud-based storage accessible via a network, such as the Internet.

Memory 503 may include volatile memory 514 and non-volatile memory 508. The machine 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 500 may include or have access to a computing environment that includes input 506, output 504, and a communication connection 516. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to the machine 500, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 502 (sometimes called processing circuitry) of the machine 500. A hard drive, CD-ROM, and RAM are some examples of articles including a non-transitory computer-readable medium such as a storage device. For example, a computer program 518 may be used to cause processing unit 502 to perform one or more methods or algorithms described herein.

Note that the term "circuitry" or "circuit" as used herein refers to, is part of, or includes hardware components, such as transistors, resistors, capacitors, diodes, inductors, amplifiers, oscillators, switches, multiplexers, logic gates (e.g., AND, OR, XOR), power supplies, memories, or the like, such as can be configured in an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" or "circuit" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

ADDITIONAL NOTES AND EXAMPLES

Example 1 includes a device comprising a first voltage regulator configured to provide first voltage of a first voltage value, a second voltage regulator configured to provide a second voltage of a second, different voltage value, a first capacitor electrically coupled between a first output of the first voltage regulator and a ground, a second capacitor electrically coupled between a second output of the second voltage regulator and the ground, a first switch electrically coupled between the first output and the second output, a second switch situated in parallel with the first switch, the second switch electrically coupled between the first output and the second output, and a controller configured to provide control signals that control the first voltage regulator, the second voltage regulator, the first switch, and the second switch.

In Example 2, Example 1 further includes, wherein the first switch and the second switch are situated to, when activated, make the first and second bulk capacitors electrically in parallel to each other.

In Example 3, at least one of Examples 1-2 further includes, wherein the first switch and the second switch are situated to, when activated, reduce parasitic resistance and parasitic inductance of the first and second voltage regulators to a processor.

In Example 4, at least one of Examples 1-3 further includes, wherein the controller is configured to receive a signal indicating a processor coupled to the first and second outputs is in a low power mode, and responsive to receiving the low power signal, activate the first and second switches.

In Example 5, at least one of Examples 1-4 further includes, wherein the first voltage regulators include first inductors, and the second voltage regulators includes second inductors, wherein the controller is configured to receive a signal indicating a processor coupled to the first and second outputs is in a low power mode, and responsive to receiving the signal, turn off the first voltage regulator or the second voltage regulator.

In Example 6, Example 5 further includes, wherein the controller is further configured to responsive to receiving the signal, activate only one inductor of the first inductors and the second inductors of the voltage regulator that is turned on.

In Example 7, Example 6 further includes, wherein the only one inductor is an inductor that includes a physically shortest electrical path to a processor coupled to the first and second outputs.

Example 8 includes a device comprising a first voltage regulator configured to provide first voltage of a first voltage value, a second voltage regulator configured to provide a second voltage of a second, different voltage value, a first capacitor electrically coupled between a first output of the first voltage regulator and a ground, a second capacitor electrically coupled between a second output of the second voltage regulator and the ground, a first switch electrically coupled between the first output and the second output, and a second switch situated in parallel with the first switch, the second electrically coupled between the first output and the second output.

In Example 9, Example 8 further includes, wherein the first switch and second switch are electrically coupled to receive a control signal from a controller.

In Example 10, Example 9 further includes, wherein the control signal is asserted when a processor coupled to the first and second outputs is in a low power mode and causes the first output and the second output to short to each other.

In Example 11, Example 10 further includes, wherein the control signal is asserted only when the die is in the low power mode.

In Example 12, at least one of Examples 8-11 further includes, wherein the first switch and the second switch are situated to, when activated, make the first and second bulk capacitors electrically in parallel to each other.

In Example 13, at least one of Examples 8-12 further includes, wherein the first and the second switch are situated to, when activated, reduce parasitic resistance and parasitic inductance of the first and second voltage regulators to a processor.

Example 14 includes a device comprising a processor, multiple voltage regulators electrically coupled to provide different voltage values to the die, multiple capacitors, one for each voltage regulator, each capacitor electrically coupled between output of a voltage regulator of the voltage regulators and ground, multiple switches electrically coupled between the outputs of directly adjacent voltage regulators of the voltage regulators, and a controller configured to provide control signals that control the voltage regulators and the switches.

In Example 15, Example 14 further includes, wherein a first switch of the switches and a second switch of the switches are electrically situated between outputs directly adjacent voltage regulators of the voltage regulators and configured to, when activated, make the capacitors electrically in parallel to each other.

In Example 16, Example 15 further includes, wherein a first and a second switch of the switches are electrically situated between same outputs of the voltage regulators as the first switch and the second switch is situated to, when activated, reduce parasitic resistance and parasitic inductance of the first and second voltage regulators to the processor.

In Example 17, at least one of Examples 14-16 further includes, wherein the controller is configured to receive a signal indicating the die is in a low power mode, and responsive to receiving the signal, activate the switches.

In Example 18, at least one of Examples 14-17 further includes, wherein the voltage regulators each include respective inductors, wherein the controller is configured to receive a signal indicating the processor is in a low power mode, and responsive to receiving the signal, turn off all but one of the voltage regulators.

In Example 19, Example 18 further includes, wherein the controller is further configured to responsive to receiving the signal, activate less than all inductors of a voltage regulator of the voltage regulators that is turned on.

In Example 20, Example 19 further includes, wherein one inductor of the less than all inductors is an inductor that includes a physically shortest electrical path to the die.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device comprising:
a first voltage regulator configured to provide a first VR output;
a second voltage regulator configured to provide a second VR output independent of the first VR output;
a first capacitor electrically coupled between the first VR output and a ground;
a second capacitor electrically coupled between the second VR output and the ground;
a first switch electrically coupled between the first VR output and the second VR output;
a second switch situated in parallel with the first switch, the second switch electrically coupled between the first VR output and the second VR output; and
a controller configured to provide control signals that control the first voltage regulator, the second voltage regulator, the first switch, and the second switch, wherein the first switch and the second switch are situated, when activated, to reduce parasitic output resistance and parasitic output inductance of the first voltage regulator to a load.

2. The device of claim 1, wherein the first switch and the second switch are situated to, when activated, make the first and second capacitors electrically in parallel to each other.

3. The device of claim 1, wherein the controller is configured to:
receive a signal indicating a processor coupled to the first and second outputs is in a low power mode; and
responsive to receiving the low power signal, activate the first and second switches.

4. The device of claim 1, wherein the first voltage regulator includes first inductors, and the second voltage regulator includes second inductors, wherein the controller is configured to:
receive a signal indicating a processor coupled to the first and second VR outputs is in a low power mode; and
responsive to receiving the signal, turn off the first voltage regulator or the second voltage regulator.

5. The device of claim 4, wherein the controller is further configured to responsive to receiving the signal, activate only one inductor of the first inductors and the second inductors of the voltage regulator that is turned on.

6. The device of claim 5, wherein the only one inductor is an inductor that includes a physically shortest electrical path to a processor coupled to the first and second VR outputs.

7. A device comprising:
a first voltage regulator configured to provide a first VR output;
a second voltage regulator configured to provide a second VR output;
a first capacitor electrically coupled between the first VR output and a ground;
a second capacitor electrically coupled between the second VR output and the ground;
a first switch electrically coupled between the first VR output and the second VR output; and
a second switch situated in parallel with the first switch, the second switch electrically coupled between the first VR output and the second VR output, wherein the first switch and the second switch are situated, when activated, to reduce parasitic output resistance and parasitic output inductance of the first and second VR outputs coupled to a common load.

8. The device of claim 7, wherein the first switch and second switch are electrically coupled to receive a control signal from a controller.

9. The device of claim 8, wherein the control signal is asserted when a processor is the load coupled to the first and second VR outputs and is in a low power mode and causes the first VR output and the second VR output to short to each other.

10. The device of claim 9, wherein the control signal is asserted only when the processor is in the low power mode.

11. The device of claim 7, wherein the first switch and the second switch are situated to, when activated, make the first and second capacitors electrically in parallel to each other.

12. A device comprising:
- a first voltage regulator including a first VR output that is coupled to a processor;
- a second voltage regulator including a second VR output that is coupled to the processor;
- a first capacitor electrically coupled between the first VR output and a ground;
- a second capacitor electrically coupled between the second VR output and the ground;
- a first switch electrically coupled between the first VR output and the second VR output;
- a second switch disposed in parallel with the first switch across the first and second VR outputs, The first and second switches being spaced apart from one another through conductive traces, the first and second switches, when closed, reducing parasitic inductances and resistances from the conductive traces.

13. The device of claim 12, wherein the first voltage regulator includes first inductors, and the second voltage regulator includes second inductors, wherein a controller is configured to:
- receive a signal indicating the processor coupled to the first and second VR outputs is in a low power mode; and
- responsive to receiving the signal, turn off the first voltage regulator or the second voltage regulator.

14. The device of claim 13, wherein the controller, responsive to receiving the signal, is configured to activate only one inductor of the first inductors and the second inductors of the voltage regulator that is turned on.

15. The device of claim 14, wherein the only one inductor is an inductor that includes a physically shortest electrical path to a processor coupled to the first and second VR outputs.

\* \* \* \* \*